(12) United States Patent
van Triest et al.

(10) Patent No.: US 10,119,883 B2
(45) Date of Patent: Nov. 6, 2018

(54) EVACUABLE FLEXIBLE LEAKAGE TEST CHAMBER

(71) Applicant: INFICON GmbH, Cologne (DE)

(72) Inventors: Hendrik van Triest, Cologne (DE); Silvio Decker, Cologne (DE)

(73) Assignee: INFICON GmbH, Cologne (DE)

( * ) Notice: Subject to any disclaimer, the term of this patent is extended or adjusted under 35 U.S.C. 154(b) by 131 days.

(21) Appl. No.: 15/126,470

(22) PCT Filed: Mar. 12, 2015

(86) PCT No.: PCT/EP2015/055181
§ 371 (c)(1),
(2) Date: Sep. 15, 2016

(87) PCT Pub. No.: WO2015/140042
PCT Pub. Date: Sep. 24, 2015

(65) Prior Publication Data
US 2017/0097275 A1    Apr. 6, 2017

(30) Foreign Application Priority Data
Mar. 18, 2014   (DE) .......................... 10 2014 205 027

(51) Int. Cl.
*G01M 3/32*    (2006.01)

(52) U.S. Cl.
CPC ............ *G01M 3/3281* (2013.01); *G01M 3/32* (2013.01); *G01M 3/3209* (2013.01)

(58) Field of Classification Search
CPC ..... G01M 3/32; G01M 3/3291; G01M 3/3209
See application file for complete search history.

(56) References Cited

U.S. PATENT DOCUMENTS

| 4,593,554 | A | | 6/1986 | Aarts | |
|---|---|---|---|---|---|
| 5,513,516 | A | * | 5/1996 | Stauffer | G01M 3/3218 73/49.2 |
| 6,460,405 | B1 | * | 10/2002 | Mayer | G01M 3/20 73/40.7 |
| 6,513,366 | B1 | | 2/2003 | Stauffer | |

FOREIGN PATENT DOCUMENTS

| DE | 19642099 A1 | 4/1998 |
|---|---|---|
| EP | 0741288 A1 | 11/1996 |
| GB | 840294 | 7/1960 |

OTHER PUBLICATIONS

Edwards et al., Permeability of Rubber to Gases, Feb. 25, 1920, Scientific Papers of the Bureau of Standards, vol. 10, pp. 327-362.*

* cited by examiner

*Primary Examiner* — Hezron E Williams
*Assistant Examiner* — David Z Huang
(74) *Attorney, Agent, or Firm* — The Webb Law Firm

(57) ABSTRACT

An evacuable flexible test chamber (10) for a leakage test of a test piece, having a wall (12) surrounding a test chamber volume (36), is characterized in that at least a portion of said wall is made up of two layers (18, 20) of wall material of which at least the layer (20) facing said test chamber volume (36) is made from a flexible material, and that between said two layers (18, 20) an overpressure as compared to the atmosphere surrounding said test chamber (10) is adapted to be created.

9 Claims, 2 Drawing Sheets

EVACUABLE FLEXIBLE LEAKAGE TEST CHAMBER

CROSS-REFERENCE TO RELATED APPLICATIONS

This application is the United States national phase of International Application No. PCT/EP2015/055181 filed Mar. 12, 2015, and claims priority to German Patent Application No. 10 2014 205 027.8 filed Mar. 18, 2014, the disclosures of which are hereby incorporated in their entirety by reference.

BACKGROUND OF THE INVENTION

Field of the Invention

The invention relates to an evacuable flexible test chamber for a leakage test of a test piece.

Description of Related Art

Such test chambers are film chambers, for example, which comprise walls made of flexible films. Such a test chamber is described in EP 0 741 288 A1. The test piece may be a food package, for example, which is to be tested for tightness. The test piece is placed into the open test chamber. Then the test chamber is closed and evacuated, wherein the flexible walls (film walls) cling to the test piece. Here the term "vacuum" is not to be understood as an absolute vacuum but generally as a lower pressure than that of the atmosphere surrounding the test chamber. The flexible test chamber walls cling to the test piece once the pressure inside the test chamber is lower than that of the atmosphere surrounding the test chamber. Accordingly, the term "evacuate" is also to be understood as the creation of an underpressure and not necessarily as the creation of an absolute vacuum.

When flexible test chambers are closed a problem arises in that due to the elasticity or flexibility of the flexible wall material an amount of gas is enclosed in the test chamber. The quicker the chamber is closed, the larger is the enclosed gas volume since the flexible wall material bulges due to the air resistance and traps an additional gas volume during the closing process. The duration of the evacuation of the test chamber is thus increased. The gain in velocity when the chamber is quickly closed leads to a corresponding loss of velocity during the evacuation thereof since the trapped gas volume must also be evacuated.

It is an object of the invention to provide an improved test chamber and to create an improved method for a leakage test.

SUMMARY OF THE INVENTION

The wall of the test chamber according to the invention surrounding the test chamber volume in the closed condition is made up of two layers of wall material at least in one area. The two layers hence form a double-layered wall portion, that is, a double wall. At least the layer facing the test chamber volume and the test piece contained therein is made of a flexible material, for example a film material. According to the invention, in the intermediate volume surrounded by the two layers an overpressure as compared to the atmosphere surrounding the test chamber can be created or already prevails. The overpressure preferably lies in the range of approximately 100 mbar as compared to the surrounding atmosphere. The overpressure may thus lie in a range of approximately 80 to 120 mbar as compared to the surrounding atmosphere. In the intermediate volume between the two wall layers a gas, a liquid, a foam or a gel may be present. Due to the overpressure the layer of flexible material facing the test chamber volume convexly bulges towards the test piece in the open condition of the chamber.

When the test chamber is closed the overpressure between the two layers counteracts the air resistance and the flexible layer does not trap any additional gas volume. Due to a convex bulge towards the test piece the flexible layer is pressed against the test piece and deformed by the latter. Thus the test chamber volume to be evacuated is reduced after the test chamber has been closed.

It is of particular importance that at least the layer facing the test piece and the test chamber volume is made of a flexible material. The second layer facing away from the test chamber volume may either be rigid or also be made of a flexible material. The wall of the test chamber may completely or partly be made of a flexible material, for example a film material. It is conceivable that the wall of the test chamber is continuously formed as a single piece and placed around the test piece. Alternatively, the wall may be made of two partial walls adapted to be fittingly placed on each other. The boundary areas of the wall can be held by a rigid frame. The wall portions adapted to be folded on each other can be guided by a hinge or may be connected with each other.

After the test piece has been placed into the test chamber and before the test chamber is closed, an overpressure in the range of approximately 100 mbar should prevail or be created in the intermediate volume between the two layers. For this purpose, the intermediate volume can be connected with a pump which creates the overpressure. In addition, use of a pressure relief valve for preventing pressures of more than approximately 120 mbar, for example, between the two layers is conceivable.

Between the test piece and the test chamber wall a gas-conducting material, for example a gas-conducting mat made of a nonwoven material, should be inserted for allowing a gas flow between the test piece and the wall. The gas-conducting material may extend along the entire inner side of the test chamber wall.

The flexible wall may be clamped in a rigid frame. Preferably, two flexible chamber walls, each clamped in a circular ring frame, for example, are folded on each other. Between the two frames a gas seal should be provided. A clamping element may press the frames against each other. In at least one area a hinge may be provided between the two frames.

Preferably, the intermediate volume between the two layers can be provided with a pressure sensor for measuring the pressure between the two layers. The measured pressure helps to monitor whether the pressure of the intermediate volume is in the desired range of approximately 100 mbar.

Further, the tightness of the two layers can be monitored by monitoring the pressure between the two layers. If one of the two layers is defective, the pressure between the two layers decreases.

Further, a check as to whether a test piece is in the test chamber can be performed by monitoring the pressure between the two layers when the test chamber is being closed. When the chamber having the double-layer wall is being closed, the pressure between the two layers changes since the convex bulge is pressed against the test piece or the opposite wall. If the test piece is in the test chamber, this pressure change is larger than in the case when no test piece is present. Thus possible false introduction of a test piece can be recognized at an early stage.

BRIEF DESCRIPTION OF THE DRAWINGS

Hereunder an exemplary embodiment of the invention is described with reference to the figures in which.

DETAILED DESCRIPTION

Figure 1:
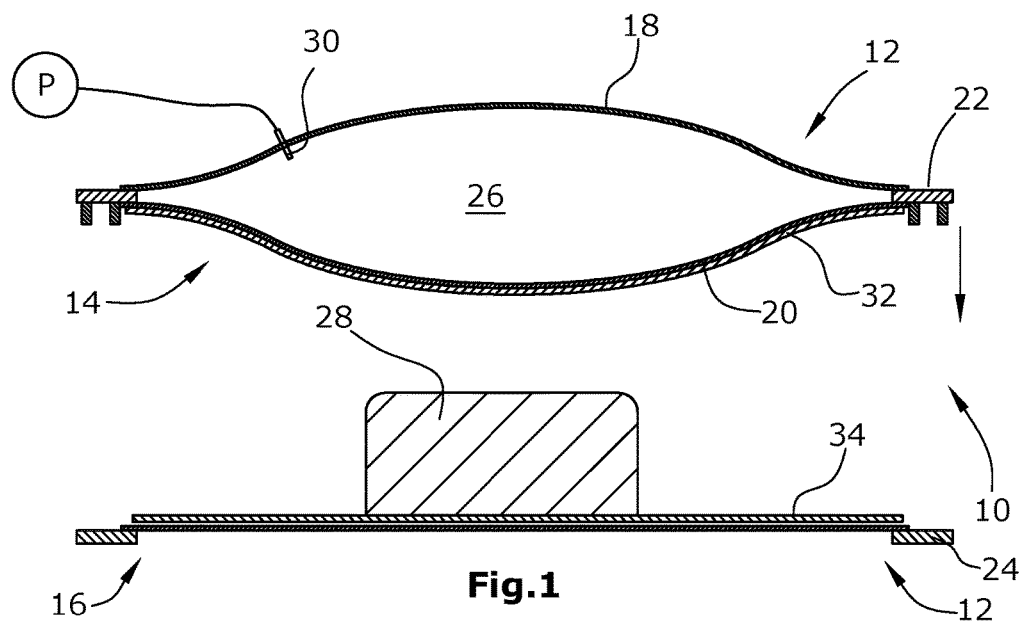
FIG. 1 shows a schematic sectional view of the exemplary embodiment in an open condition when the chamber is being closed.

The test chamber 10 comprises a wall 12 which is made up of two partial walls 14, 16. The partial wall 16 is the bottom of the test chamber 10 and the partial wall 14 is the cover of the test chamber 10. The partial wall 16 is rigid and made of metal, for example. The partial wall 14 is made up of two layers 18, 20 of a flexible film. As viewed from above, the partial walls 14, 16 are of a circular configuration and are held by a rigid frame 22, 24 shaped as a ring in their respective boundary areas. Other shapes of the partial walls 14, 16 are also conceivable where the partial walls 14, 16 comprise at least one straight side as viewed from above. The upper ring 22 sealingly holds the two film layers 18, 20 together in their outer boundary areas. Thus a gastightly closed intermediate volume 26 is defined between the two layers 18, 20. In the intermediate volume 26 a pressure of approximately 80-90 mbar prevails which counteracts the air resistance which is encountered when the upper partial wall 14 is closed in the direction indicated by the arrow in FIG. 1. Due to the overpressure the two film layers 18, 20 are convexly bulged to the outside. The lower film layer 20 is convexly bulged towards the test piece 28 when the test chamber 10 is not closed. The ring frame 22 is provided with seals not illustrated in the figures for gastightly sealing the intermediate volume 26.

A pressure sensor 30 is arranged in the intermediate volume 26 between the two layers 18, 20 and connected with a pressure measuring instrument P for measuring the pressure of the intermediate volume 26. By monitoring the pressure in the intermediate volume 26 a leakage of the film layers 18, 20 or the frame 22, that is, the upper partial wall 14, can be detected. The pressure may further indicate whether a test piece 28 is in the test chamber 10 and may indicate the volume of this test piece. The larger the volume of the test piece 28 the larger is the pressure of the intermediate volume 26, measured by the pressure measuring instrument P, in the closed condition of the test chamber as shown in FIG. 2.

With the aid of the pressure measuring instrument P the pressure can be precisely adjusted to the desired value when the intermediate volume 26 is filled. Preferably, the upper partial wall 14 is provided with a valve connection not shown in the figures for connecting a pump or a compressed gas source by means of which the intermediate volume 26 can be filled. Alternatively, it is also conceivable that the intermediate volume 26 is filled with a liquid, a foam or a gel. A pressure relief valve also not shown in the figures of the upper partial wall 14 may prevent too large a pressure from being created between the two layers 18, 20.

Figure 2:
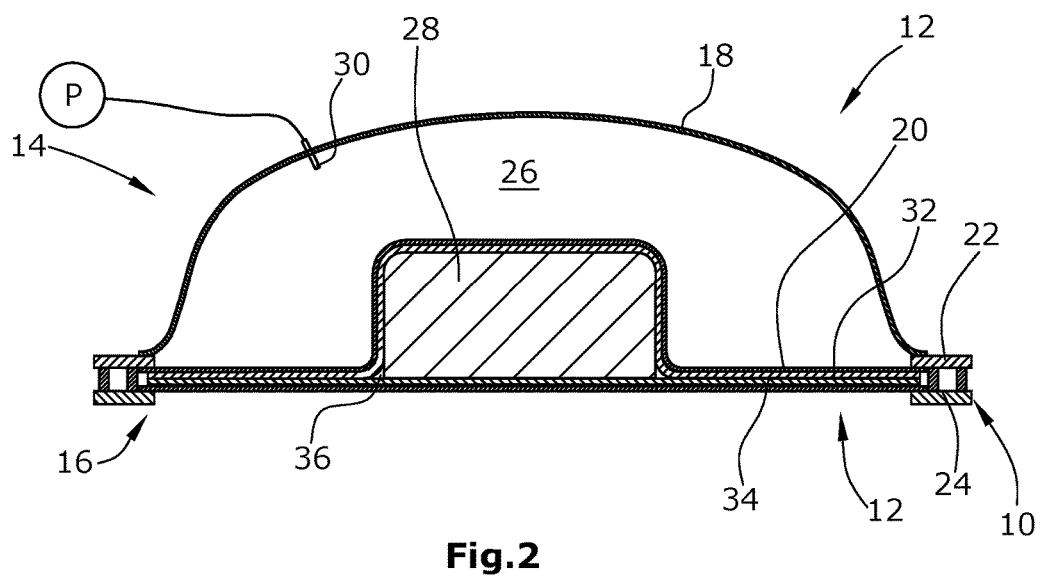
FIG. 2 shows the sectional view of FIG. 1 in the closed condition of the chamber.
Figure 3:
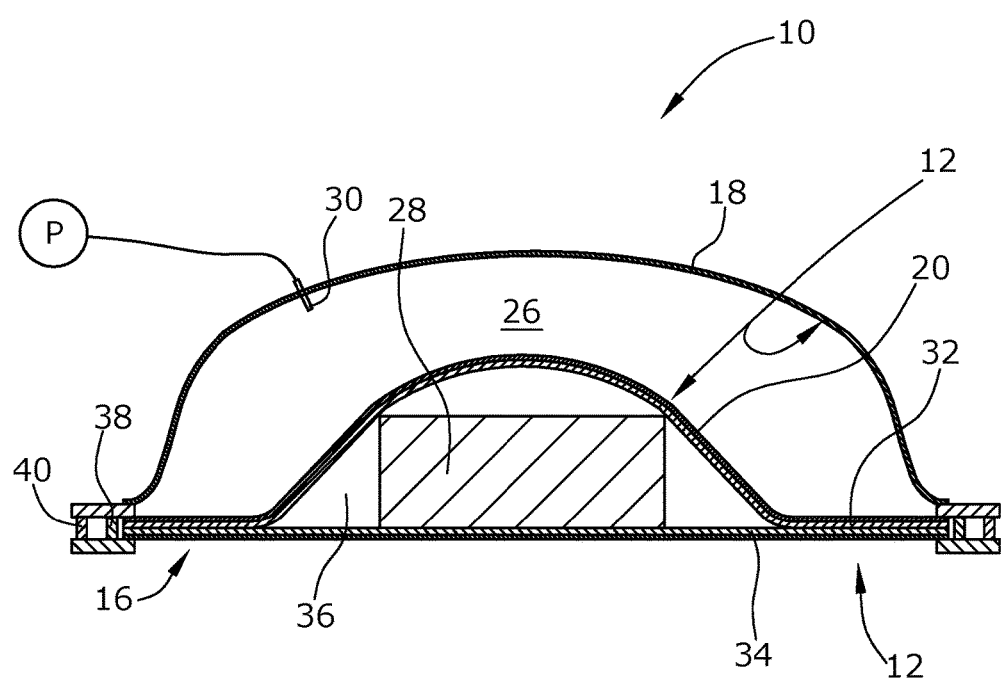
FIG. 3 shows a sectional view of the exemplary embodiment in the closed condition of the chamber before the latter is evacuated.

Between the test piece 28 and each one of the two partial walls 14, 16 a respective gas-conducting textile fabric 32, 34, such as a nonwoven material or a woven material, is inserted which causes gas to escape from the test chamber volume 36 during evacuation of the test chamber 10 in the closed condition of the test chamber 10 shown in FIG. 2. Hereunder the textile fabric is also referred to as a membrane.

The two ring frames 22, 24 are gastightly connected with each other via a first inner ring seal 38 and a second outer ring seal 40. In the closed condition the two ring frames 22, 24 are pressed against each other by a clamping device not shown in the figures.

After the test piece 28 has been placed onto the gas-conducting membrane 34 resting on the lower partial wall 16, the second gas-conducting membrane 32 is placed over the test piece as illustrated in FIG. 1. Then the upper partial wall 14 is lowered in the direction of the arrow downwards towards the test piece 28 and the lower partial wall 16 for closing the test chamber 10.

When the test chamber is being closed the cover, that is, the upper partial wall 14, can be moved more quickly than before since the overpressure in the intermediate volume 26 counteracts the air resistance encountered when the cover is lowered and prevents the flexible film layers from being deformed. Due to the convex bulging of the lower layer 20 towards the test piece 28 the test chamber volume between the two partial walls 14, 16 in the closed condition of the test chamber 10 is reduced already before the latter is evacuated. The remaining residual volume to be evacuated is thus smaller. As a result, the test chamber according to the invention allows the test chamber to be more quickly closed and evacuated and thus to be more quickly taken into operation.

The invention claimed is:

1. An evacuable flexible test chamber for a leakage test of a test piece, said test chamber comprising a wall surrounding a test chamber volume, wherein at least a portion of said wall is made up of two layers of wall material of which at least a layer facing said test chamber volume is made from a flexible material, and between said two layers an overpressure as compared to the atmosphere surrounding said test chamber is adapted to be created, the wall surrounding the test chamber volume is made up of two partial walls fittingly placed on each other, of which a first partial wall forms a bottom of the test chamber and a second partial wall forms a cover of the test chamber, the layer facing away from the test chamber volume is of rigid configuration, the layer of flexible material is permanently convexly bulged towards the test piece in an open condition of the chamber, and between the two layers, the overpressure as compared to the atmosphere surrounding the test chamber prevails.

2. The evacuable flexible test chamber according to claim 1, wherein the flexible material is a film.

3. The evacuable flexible test chamber according to claim 1, wherein between the two layers, a gas, a liquid, a foam or a gel is contained.

4. The evacuable flexible test chamber according to claim 1, wherein a pressure measuring instrument for measuring the pressure between the two layers is provided.

5. The evacuable flexible test chamber according to claim 1, wherein the wall comprises a layer of a gas-conducting material on its side facing the test chamber volume.

6. The evacuable flexible test chamber according to claim 1, wherein said overpressure is in the range of 80 mbar to 120 mbar.

7. A method for a leakage test of a test piece located in a test chamber according to claim 1, wherein the overpressure between the layers is created before said chamber is closed.

8. The method according to claim 7, wherein the tightness of the wall is checked by monitoring the pressure between the layers.

9. The method according to claim 7, wherein a check as to whether a test piece is in the test chamber is performed by monitoring the pressure between the two layers when said test chamber is being closed.

\* \* \* \* \*